United States Patent
Fukushima et al.

(10) Patent No.: US 7,279,821 B2
(45) Date of Patent: Oct. 9, 2007

(54) MOTOR

(75) Inventors: Tomohiro Fukushima, Kariya (JP); Masafumi Sakuma, Chiryu (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 212 days.

(21) Appl. No.: 11/166,194

(22) Filed: Jun. 27, 2005

(65) Prior Publication Data

US 2005/0285468 A1    Dec. 29, 2005

(30) Foreign Application Priority Data

Jun. 25, 2004    (JP)    ............................ 2004-187426

(51) Int. Cl.
*H02K 1/27*    (2006.01)
*H02K 21/12*    (2006.01)

(52) U.S. Cl. .................................. 310/156.53; 310/217

(58) Field of Classification Search .......... 310/156.08, 310/156.48, 156.49, 156.51, 156.53, 156.54, 310/156.62, 156.63, 156.65, 156.78, 156.81, 310/156.82, 89, 91, 156.07, 217

See application file for complete search history.

(56) References Cited

U.S. PATENT DOCUMENTS

| | | | |
|---|---|---|---|
| 2,059,518 A * | 11/1936 | Harley | 310/156.53 |
| 3,334,254 A | 8/1967 | Kober | |
| 4,308,479 A * | 12/1981 | Richter | 310/156.07 |
| 4,725,750 A | 2/1988 | Welch | |
| 6,072,256 A * | 6/2000 | Shon et al. | 310/156.53 |
| 6,462,449 B1 * | 10/2002 | Lucidarme et al. | 310/156.56 |
| 6,700,288 B2 * | 3/2004 | Smith | 310/218 |
| 6,781,274 B2 * | 8/2004 | Lee | 310/216 |
| 6,954,018 B2 * | 10/2005 | Kim et al. | 310/156.53 |
| 7,019,427 B2 * | 3/2006 | Sasaki et al. | 310/156.78 |

FOREIGN PATENT DOCUMENTS

| | | |
|---|---|---|
| FR | 2761211 | 9/1998 |
| JP | 2004-184645 | 6/2000 |
| JP | 2000184645 | 6/2000 |
| WO | WO 02/19504 A1 | 3/2002 |

* cited by examiner

*Primary Examiner*—Tran Nguyen
(74) *Attorney, Agent, or Firm*—Sughrue Mion, PLLC (57) ABSTRACT

A motor includes a rotor, a rotor core included in the rotor, the rotor core being configured to be embedded, therein, with at least one first magnet, a pair of end plates, one of the pair of end plates being positioned at an axial end of the motor, an other one of the pair of end plates being positioned at an other axial end of the motor, and the pair of end plates holding the rotor core at axial ends of the rotor core, and at least one second magnet embedded in the pair of end plates and supplying magnetic fields in an axial direction of the motor.

19 Claims, 11 Drawing Sheets

※ ← : Magnetizing direction
← : Magnetic field direction

※ ← : Magnetizing direction

※ ←: Magnetizing direction
⇠: Magnetic field direction

※ ←: Magnetizing direction

※ ←: Magnetizing direction
←⋅: Magnetic field direction

※ ←: Magnetizing direction

FIG. 15

MOTOR

CROSS REFERENCE TO RELATED APPLICATIONS

This application is based on and claims priority under 35 U.S.C. §119 with respect to Japanese Patent Application 2004-187426, filed on Jun. 25, 2004, the entire content of which is incorporated herein by reference.

FIELD OF THE INVENTION

This invention generally relates to an interior permanent magnetic motor (IPM motor), especially to how to implant a permanent magnet into a rotor structure for high efficiency.

BACKGROUND

In recent technologies, a brushless motor having a rotor, which is embedded, therein, with plural permanent magnets, arranged in place at a predetermined distance relative to an inner periphery of a stator, of which a stator core is wound with coils, has been widely applied to an electric vehicle. A stator core is of cylindrical structure and is integrally formed with plural teeth protruding in a radially inner direction from an outer periphery thereof. These plural teeth are wound with coils. Portions of each coil, which appear axially outwardly from ends of the stator core, are, in general, referred to as coil ends. A rotor is formed in such a manner that a rotor core, which is attached, therein, with plural permanent magnets, is integrally equipped to a shaft, and is inserted into an inner side of the stator with the windings so as to be seated therein. The rotor rotates in response to electromagnetic force that is generated by electrically exciting the stator windings, as needed.

Figure 15:
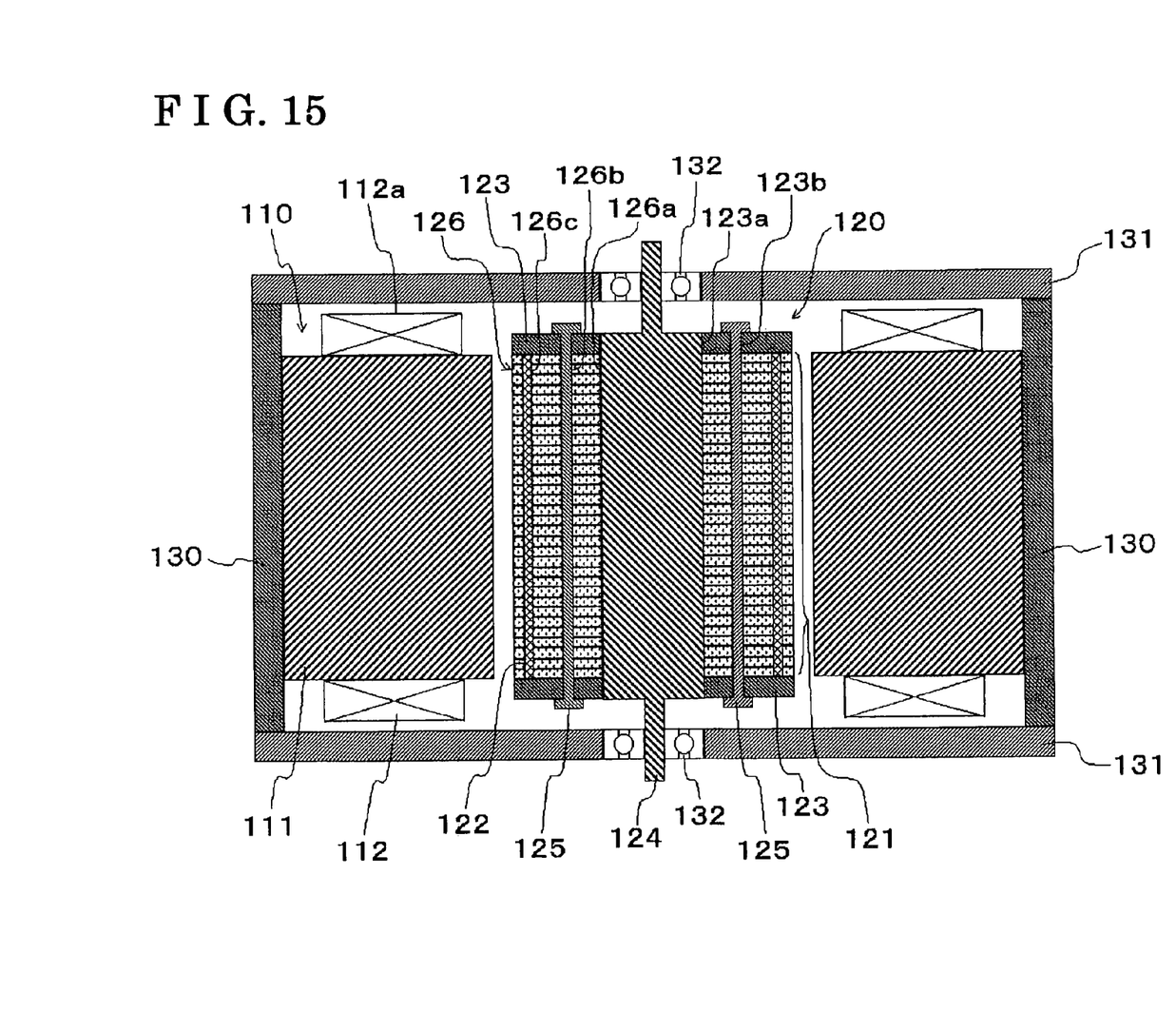
FIG. 15 is a sectional view schematically illustrating a structure of a conventional motor.

This type of conventional brushless motor is disclosed in JP2000-184645A and is described below with reference to FIG. 15. As is clearly illustrated in FIG. 15, a rotor 120 is equipped with a rotor core 121, permanent magnets 122, a pair of end plates 123, a shaft 124 and rivets 125. The rotor core 121 is a laminated body which is formed with plural core plates 126 that are layered. The rotor core 121 is held, at both axial ends thereof, by the pair of end plates 123, and is integrally fixed to the end plates 123 by means of the plural rivets 125. The core plates 126 each has a penetrating hole 126a, which is defined at a central portion of each core plate 126 and is employed for inserting the shaft 124 thereinto, plural penetrating holes 126b, which are defined at an outer peripheral side of the penetrating hole 126a and are employed for the plural rivets 125, and plural penetrating holes 126c, which are defined at a further outer peripheral side of the penetrating holes 126b and are employed for attaching the plural permanent magnets 122 thereinto. The respective permanent magnets 122 are inserted into the plural penetrating holes 126c and are fixed thereto. Each of the pair of end plates 123 has a penetrating hole 123a, which is defined at a central portion thereof and is employed for inserting the shaft 124 thereinto, and plural penetrating holes 123b, which are defined at an outer peripheral side of the penetrating hole 123a and are employed for the plural rivets 125. The respective rivets 125 are inserted into the plural penetrating holes 123b of the pair of end plates 123 and the plural penetrating holes 126b of the core plates 126. Both ends of the respective rivets 125, which appear axially outwardly from the end plates 123, are caulked.

In this type of conventional brushless motor, a running torque is generated by electrically exciting, in a vertically sectional direction of a rotational axis, a stator core 111, the rotor core 121 and the permanent magnets 122. That is, a magnetic field, which generates a running torque, is not effectively applied to spaces axially defined between coil ends 112a and the end plates 123. Therefore, in this type of conventional brushless motor, these spaces have not effectively contributed to generation of a running torque. As a result, an axial length of the motor is extended in response to a thickness (an axial length) of the coil ends 122a, or of the end plates 123. Moreover, the end plates 123 hold the permanent magnets 122 in an axial direction, the magnets 122 which have been housed in the rotor core 121.

The present invention has been made in view of the above circumstances, and provides a motor of which axial length can be abbreviated. Further, the present invention provides a motor which enables increasing in a degree of torque.

SUMMARY OF THE INVENTION

According to an aspect of the present invention, a motor includes: a rotor; a rotor core included in the rotor, the rotor core included in the rotor, the rotor core which is configured to be built, thereinto, with at least one first magnet; and a pair of end plates, one of which is positioned at an axial end of the motor, the other one of which is positioned at the other axial end of the motor. The pair of end plates holds the rotor core at axial ends of the rotor core. The motor further includes at least one second magnet built into the pair of end plates and capable of producing magnetic fluxes in an axial direction of the motor.

It is preferable that the at least one second magnet is positioned so as to be in contact with the at least one first magnet.

It is further preferable that the at least one second magnet is positioned so as to be in contact with a portion of the rotor core which is positioned at a radially outer side of the at least one first magnet. A number of poles of the at least one second magnet at each of the pair of end plates is equal to a number of poles of the at least one first magnet, and a polarity of the second magnet at a side of the rotor core is identical to a polarity at an outer peripheral side of the at least one first magnet.

It is still further preferable that a portion of the pair of end plates, which is axially opposite to a side of the rotor has a soft magnetic material, and at least a portion of the pair of end plates, which corresponds to the at least one first magnet, has a nonmagnetic portion.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be described hereinbelow in detail with reference to the accompanying drawings.

Figure 1:
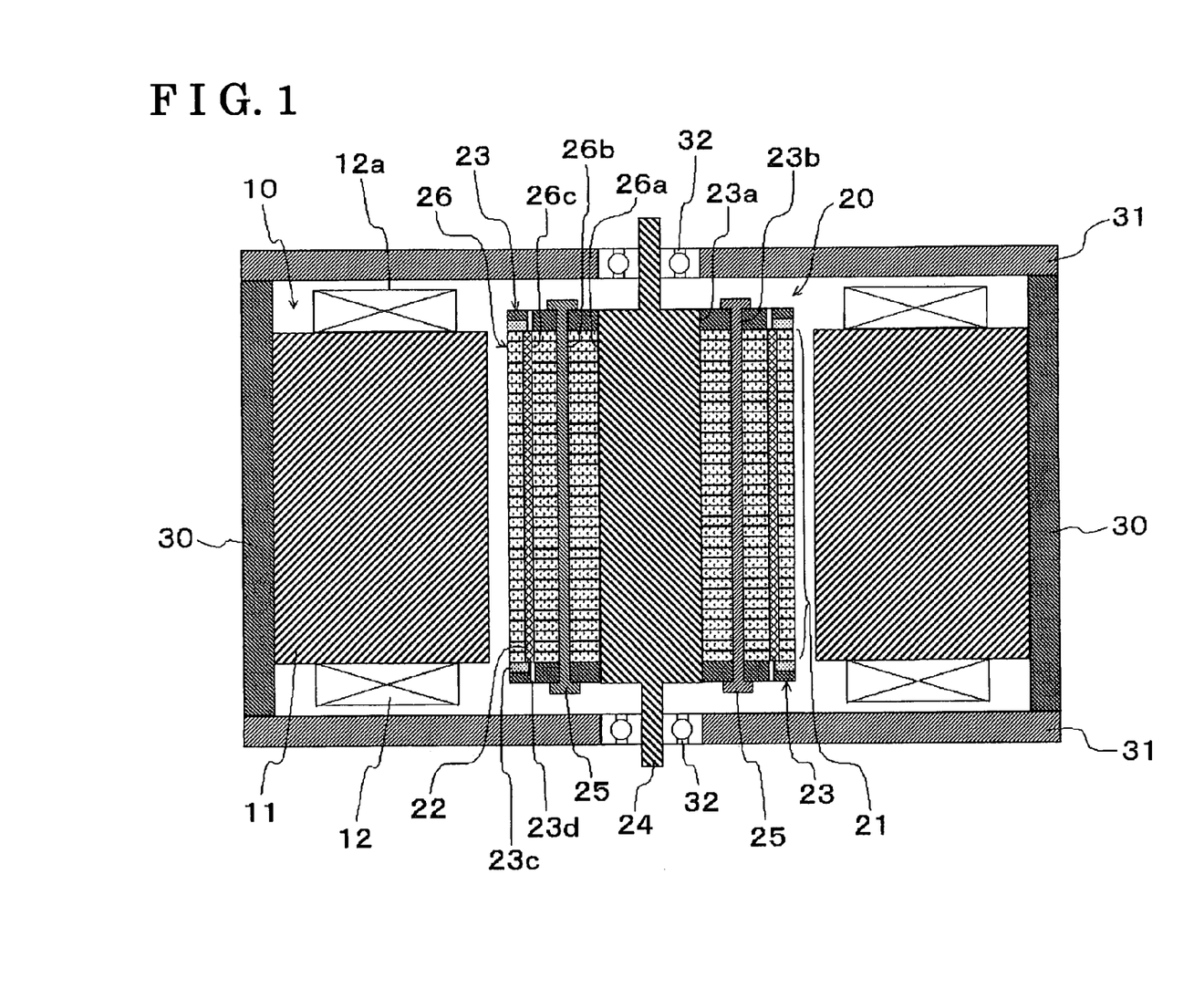
FIG. 1 is a sectional view schematically illustrating a structure of a motor according to a first embodiment of the present invention.
Figure 2:
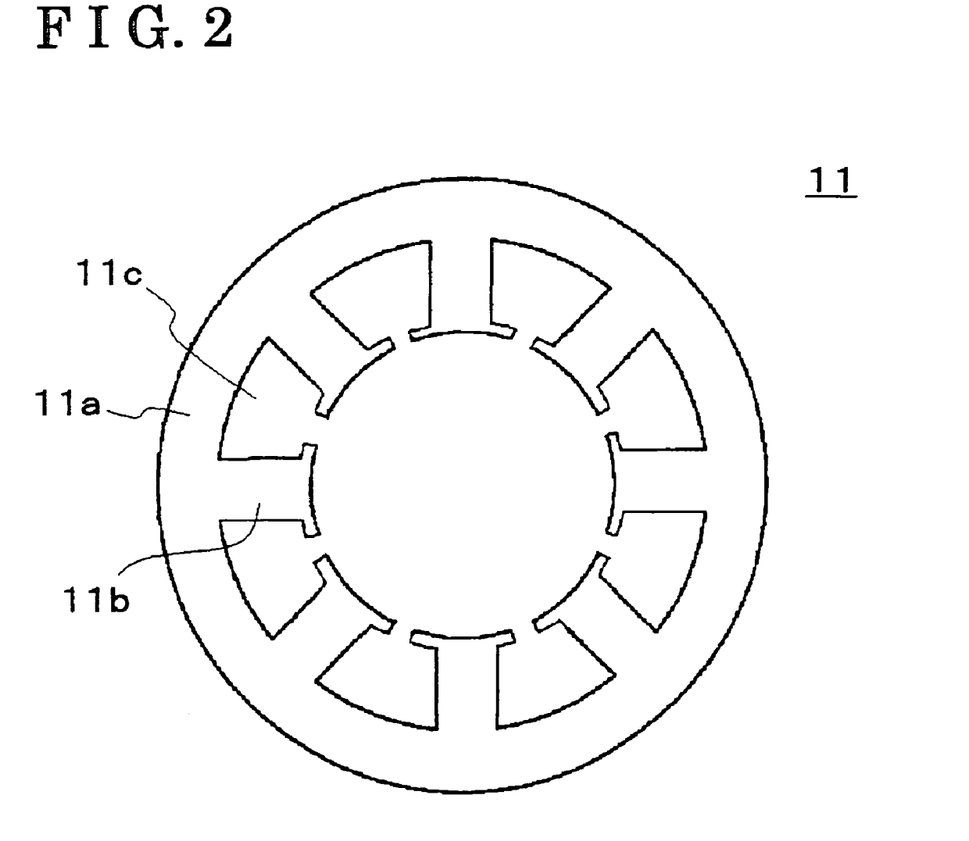
FIG. 2 is a plan view schematically illustrating a structure of a stator core of the motor.

As is illustrated in FIG. 1, a motor according to a first embodiment of the present invention is a brushless motor, which has a stator 10 (a non-rotating armature), a rotor 20 and a casing 30. The stator 10 is, as a whole, of an annular shape, or of a cylindrical shape, and mainly consists of a stator core 11 and coils 12. The stator core 11 is a stacked lamination with plural stator steel plates (not illustrated) which are formed by punching silicon steel plates, and is caulked. The stator core 11 is integrally formed with eight teeth 11b which protrude radially inwardly from an outer periphery 11a of the stator core 11, as is illustrated in FIG. 2. Slots 11c are defined between the respective neighboring teeth 11b. According to the first embodiment of the present invention, there are eight teeth 11b and eight slots 11c incorporated into the stator core 11. The shape, and the number, of each are not limited to the above, and can be designed as required. Further, according to the first embodiment of the present invention, the stator core 11 is a stacked lamination with plural stator steel plates, but the stator core 11 can be a steel product, or can be made of a sintered metal.

The teeth 11b are respectively wound with coils 12 which are inserted into the slots 11c. Portions of the coils 12, which appear axially outwardly from the stator core 11, are coil ends 12a. One tip ends of the coils 12 are connected to terminals (not illustrated) which are provided so as to supply electric current from an exterior source to the windings 12. The stator core 11, the coils 12 and the terminal can be molded with an isolative sealing material (not illustrated). In order to transmit, with a high degree of heat conductivity, heat generated by the windings 12 to the stator core 11, an insulator (not illustrated) having heat conduction can be provided at each airgap between the respective teeth 11b and the respective windings 12. Coil wires for the coils 12 can be coated wires and are wound at the teeth 11b at required wire turns. A material for the coil wire can be a conducting material such as copper, aluminum, and brass, as non-limiting examples.

The rotor 20 mainly consists of a rotor core 21, which is attached, therein, with plural permanent magnets 22 (at least one first magnet), and a shaft 24, which is integrally equipped with the rotor core 21. The rotor 20 is inserted into an inner side of the stator 10 with an airgap relative to an inner periphery of the stator 10. The rotor 20 includes the rotor core 21, the permanent magnets 22, a pair of end plates 23, a shaft 24 and plural rivets 25. The rotor core 21 is a stacked lamination with plural core plates 26. The rotor core 21 is held, at both axial ends thereof, by the pair of end plates 23, and is integrally fixed to the pair of end plates 23 by the plural rivets 25.

Figure 7:
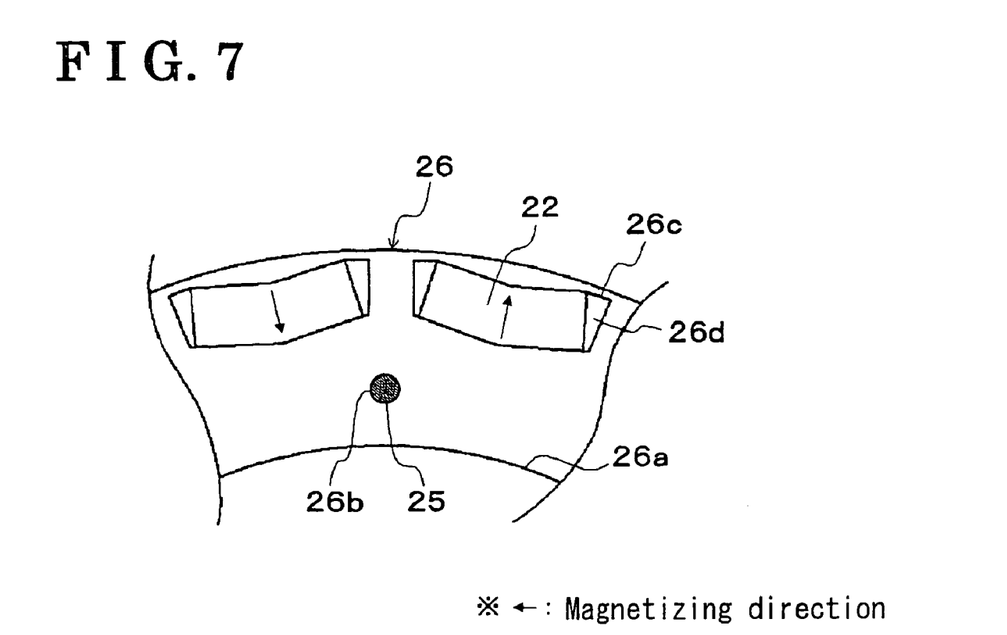
FIG. 7 is a plan view schematically illustrating, partially on a large scale, a structure of a core plate of the motor as seen from a d direction in FIG. 3.

The core plates 26 respectively include a penetrating hole 26a, which is defined at a central portion of the respective core plates 26 and is employed for inserting the shaft 24 thereinto, and plural penetrating holes 26b, which are defined at a radially outer side of the penetrating hole 26a and are employed for the rivets 25, and plural penetrating holes 26c, which are defined at a radially outer side of the penetrating hole 26b and are employed for the permanent magnets 22. In each penetrating hole 26c, airgaps 26d are defined within a range that is not filled with the permanent magnets 22, and at both ends of each permanent magnet 22. These permanent magnets 22 are inserted into the penetrating holes 26c of the core plates 26 so as to be seated therein.

Each of the end plates 23 includes a penetrating hole 23a, which is defined at a central portion of each endplate 23 and is employed for inserting the shaft 24 thereinto, and plural penetrating holes 23b, which are defined at a radially outer side of the penetrating hole 23a and is employed for the rivets 25. Each of the end plates 23 is moreover embedded, therein, with plural permanent magnets 23c (at least one second magnet) at a side of the rotor core 21.

An area of the end plates 23, the area into which the permanent magnets 23c are not inserted into, is made of a soft magnetic material (e.g., an iron). It is preferable that a thickness, or an axial length, of each end plate 23 is designed to an extent at which DC magnetic saturation does not occur due to magnetic flux of the permanent magnets 23c, as is summarized in FIG. 5. Airgaps 23d are defined between inner peripheral surfaces of the magnets 23c and soft magnetic material portions of the end plates 23, the airgaps 23d which serve as nonmagnetic portions. The airgaps 23d serve so as to prevent magnetic flux of the permanent magnets 22 from leaking. It is preferable that airgaps 23d are defined so as to include axial end surfaces of the permanent magnets 22, the axial-end surfaces which exclude areas in which the permanent magnets 22 are in contact with the permanent magnets 23c, as is illustrated in FIGS. 3 to 7.

Figure 3:
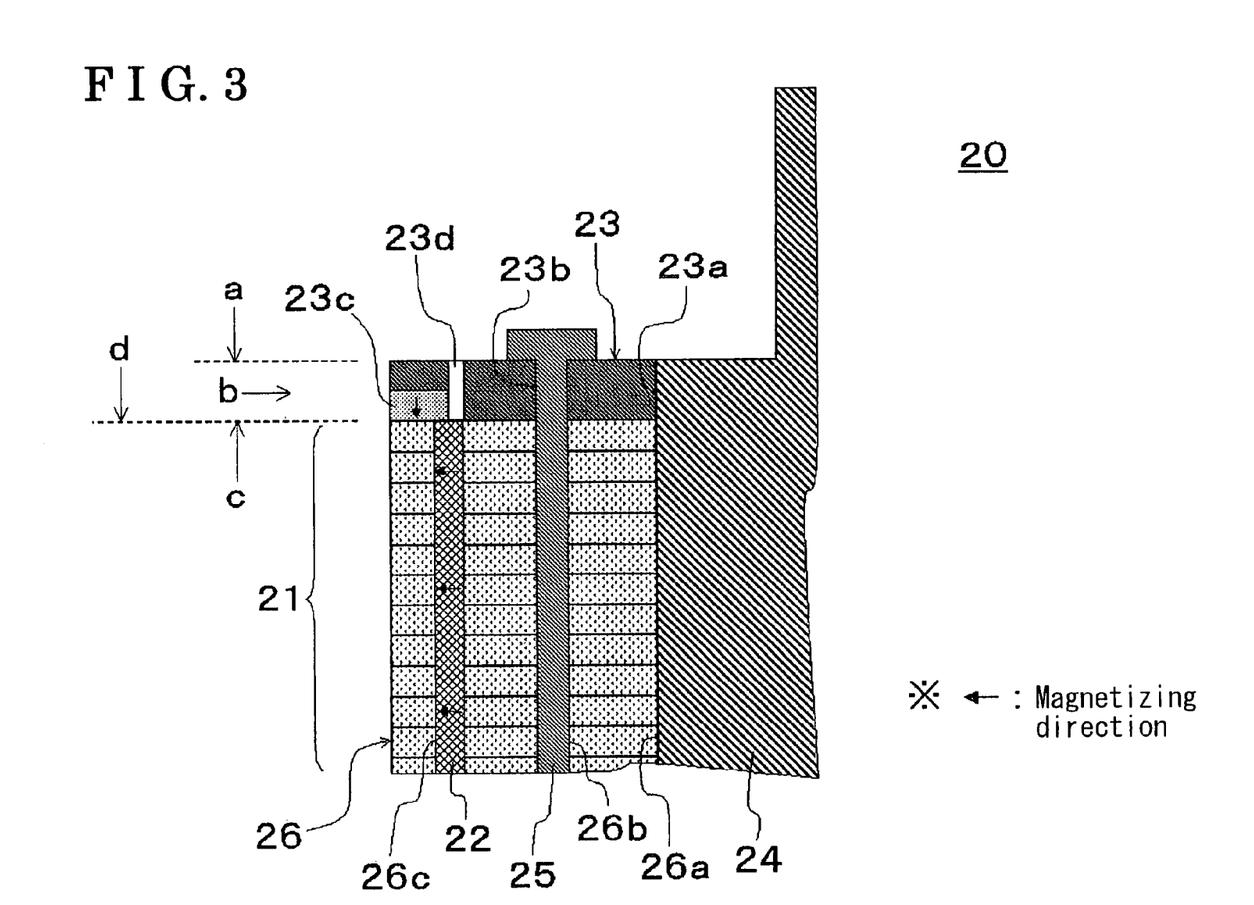
FIG. 3 is a sectional view schematically illustrating, partially on large scale, a structure of a rotor of the motor.
Figure 4:
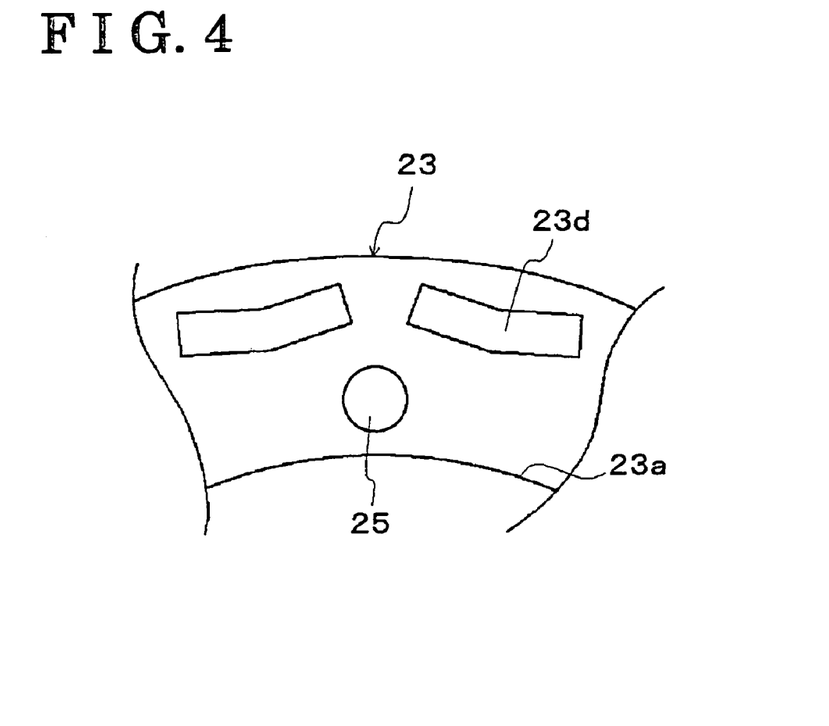
FIG. 4 is a plan view schematically illustrating, partially on a large scale, a structure of an end plate of the motor as seen from an a direction in FIG. 3.
Figure 5:
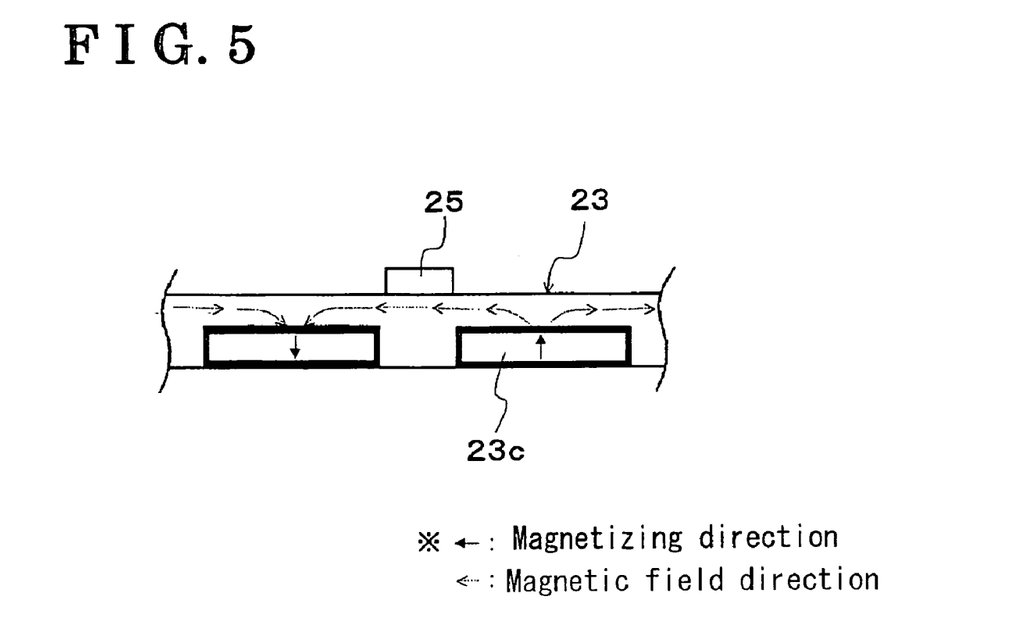
FIG. 5 is a plan view schematically illustrating, partially on a large scale, a structure of the end plate of the motor as seen from a b direction in FIG. 3.
Figure 6:
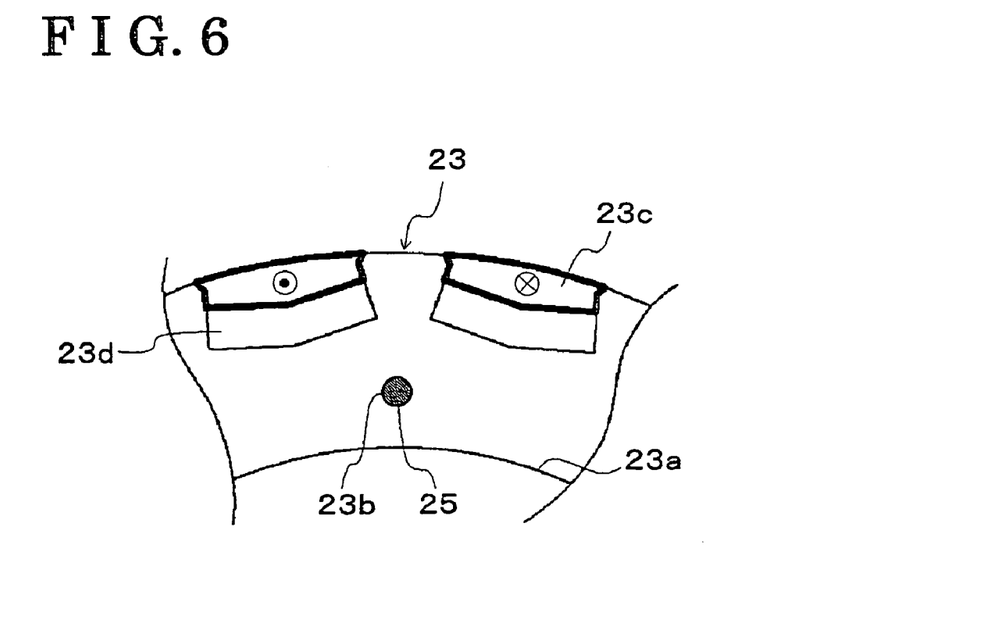
FIG. 6 is a plan view schematically illustrating, partially on a large scale, a structure of the end plate of the motor as seen from a c direction in FIG. 3.

Each permanent magnet 23c is positioned so as to contact with a portion of the rotor core 21 which is positioned at a radially outer side of the magnet 22. Further, a portion of each permanent magnet 23c is positioned at a radially outer side of the permanent magnet 22, as is illustrated in FIGS. 3 to 6. The permanent magnets 23c are axially magnetized. Regarding the end plate 23 at one side, the number of poles of the permanent magnets 23c is equal to the number of poles of the permanent magnets 22. The polarity of the respective permanent magnets 23c at the rotor core 21 side is identical to the polarity at an outer peripheral side of the respective corresponding permanent magnets 22. That is, while the permanent magnets 22 are being magnetized in a radially outer direction, the magnets 23c are magnetized in a direction towards the permanent magnets 22, while, while the permanent magnets 22 are magnetized in a radially inner direction, the magnets 23c are magnetized in a direction which is opposite to the permanent magnets 22, as is illustrated in FIGS. 3, 6, and 7.

The shaft 24 is freely rotatably supported by a pair of plates 31 via ball bearings 32.

The rivets 25 are respectively inserted into the penetrating holes 23b of the end plates 23 and the penetrating holes 26b of the core plates 26. Portions of the rivets 25 which appear axially outwardly from the end plates 23 are caulked.

The casing 30 is of a cylindrical shaped structure and surrounds an outer periphery of the stator 10, and includes the pair of plates 31 at both axial ends thereof.

Figure 8:
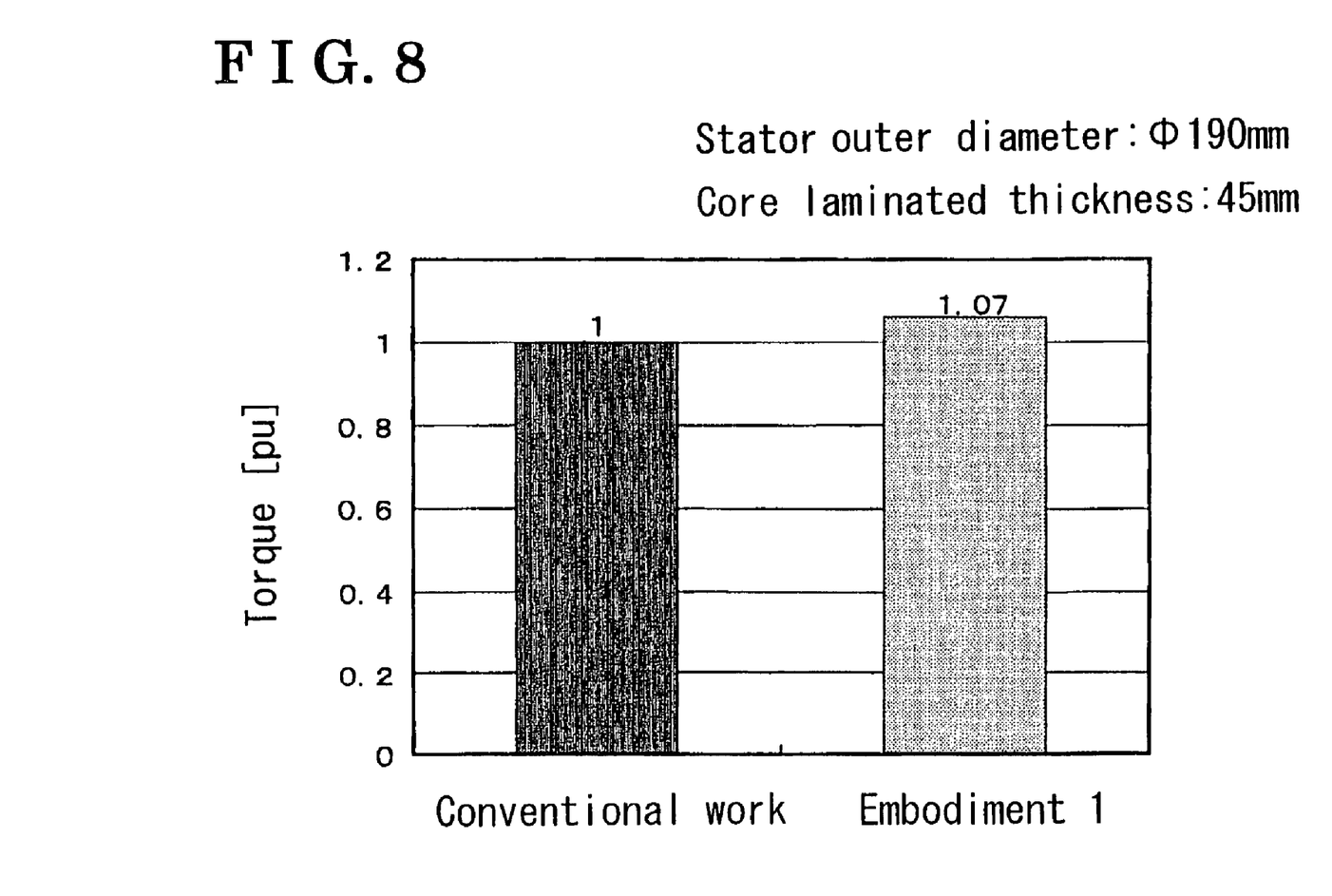
FIG. 8 is a diagram for explaining a difference between a motor torque according to the first embodiment and a torque of a conventional motor.

Next, described below is a difference between a motor torque according to the first embodiment of the present invention and a torque of a conventional motor illustrated in FIG. 15. FIG. 8 shows a result obtained by a finite element method called "FEM" for the analysis of magnetic fields. When a motor according to the first embodiment of the present invention, which has a stator outer diameter at 190 mm and a core laminated thickness at 45 mm, is compared with a conventional motor of which size is the same as described above, a relationship between a torque generated by the motor according to the first embodiment of the present invention and the torque by a conventional motor can be denoted at a ratio of 1.07:1.

According to the first embodiment of the present invention, it is possible to prevent magnetic fluxes generated from the permanent magnets 22, which are embedded into the rotor core 21, from leaking, and is possible to add magnetic fluxes of the permanent magnets 23c to the permanent magnets 22. Therefore, it is possible to increase a degree of motor torque. Moreover, according to the first embodiment of the present invention, an end plate, which did not contribute to torque generation in a conventional motor, can contribute to torque generation. Therefore, it is possible to reduce the laminated thickness of the rotor core 21, thereby enabling to abbreviate an axial length of a motor.

Figure 9:
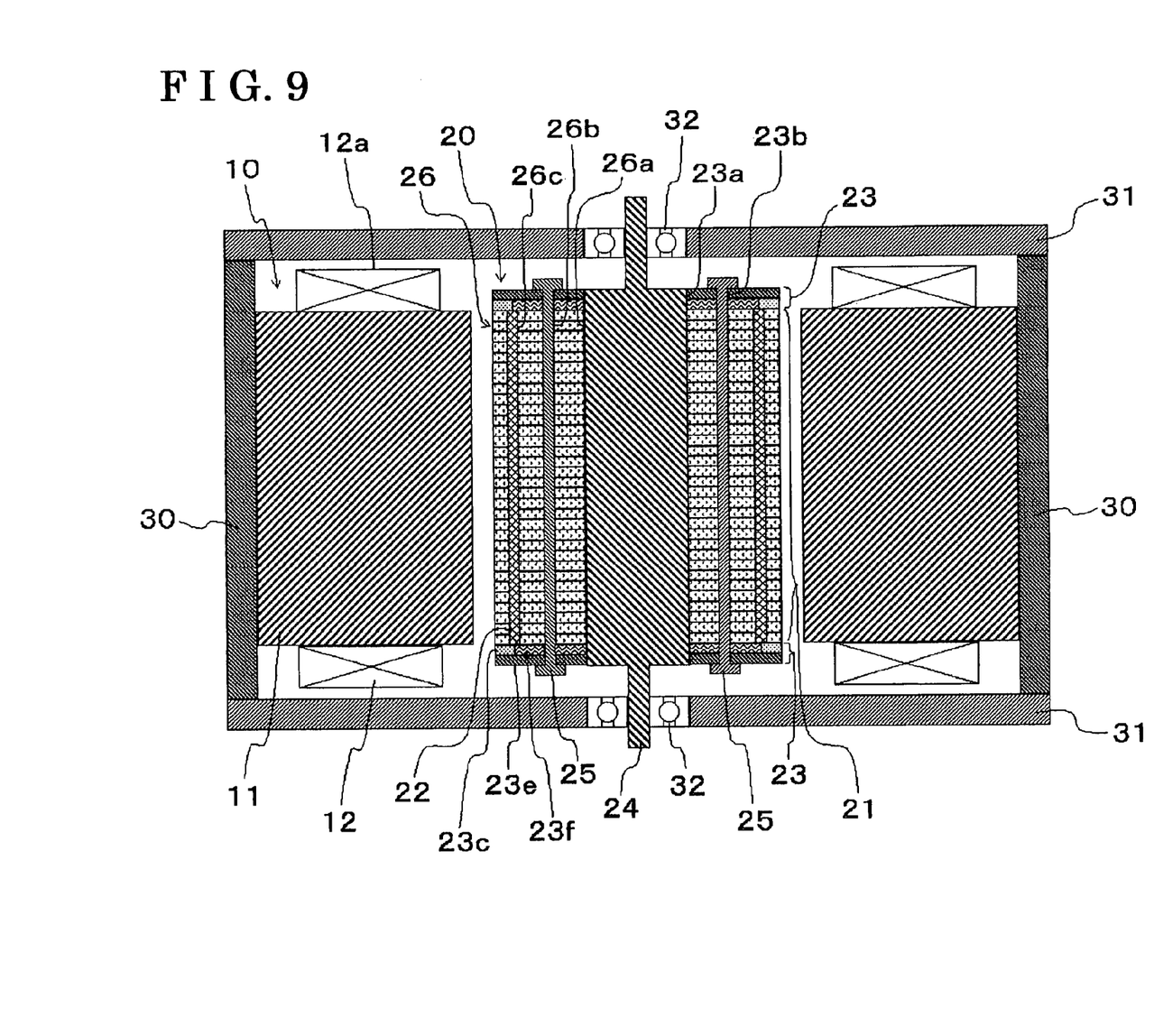
FIG. 9 is a cross sectional view schematically illustrating a structure of a motor according to a second embodiment of the present invention.
Figure 10:
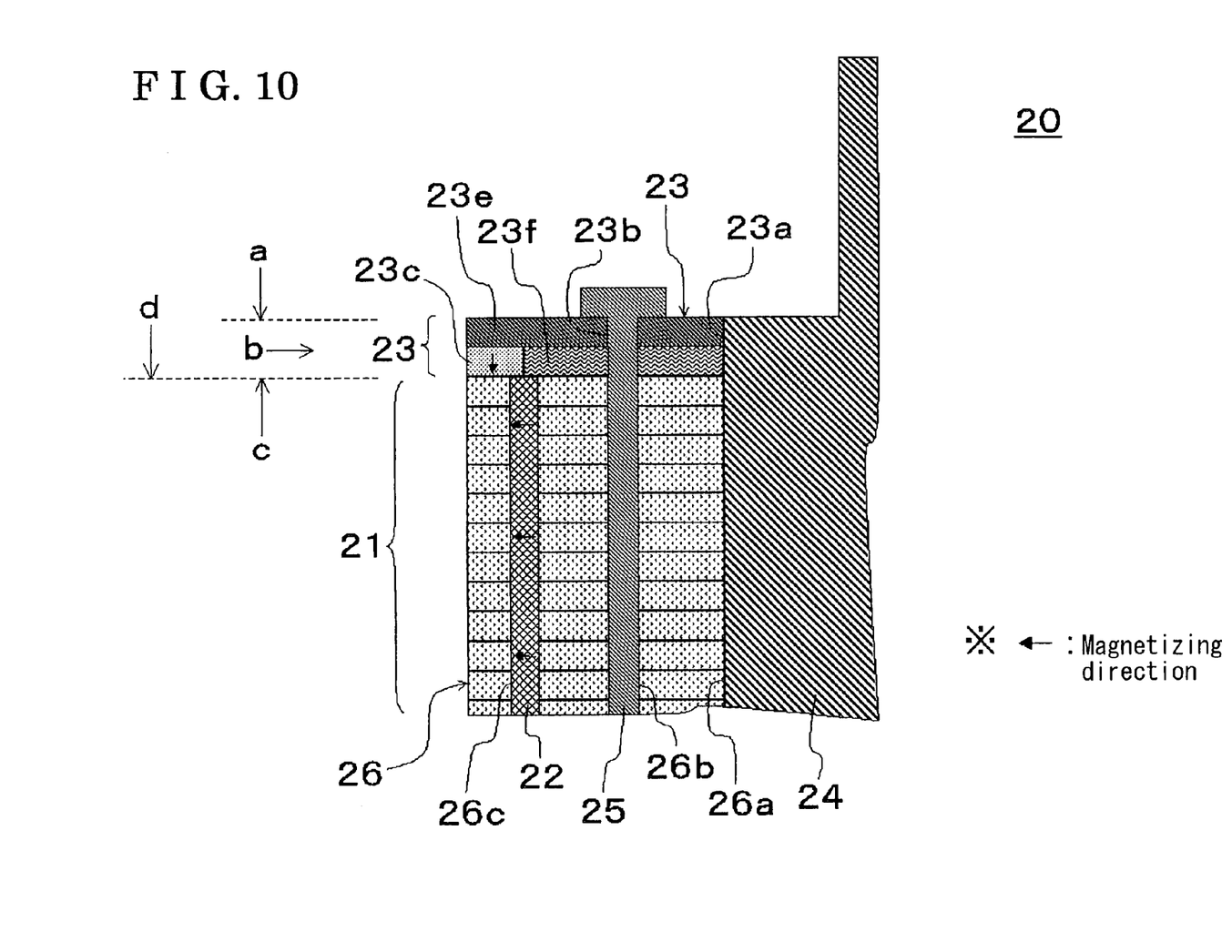
FIG. 10 is a sectional view schematically illustrating, partially on a large scale, a structure of a rotor of the motor illustrated in FIG. 9.
Figure 11:
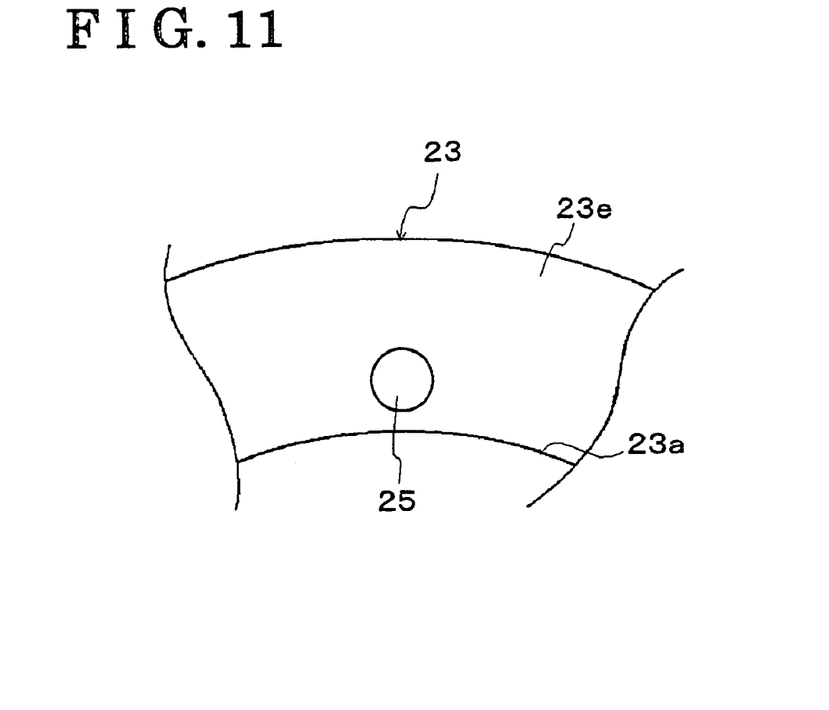
FIG. 11 is a plan view schematically illustrating, partially on a large scale, a structure of an end plate of the motor as seen from an a direction in FIG. 10.
Figure 12:
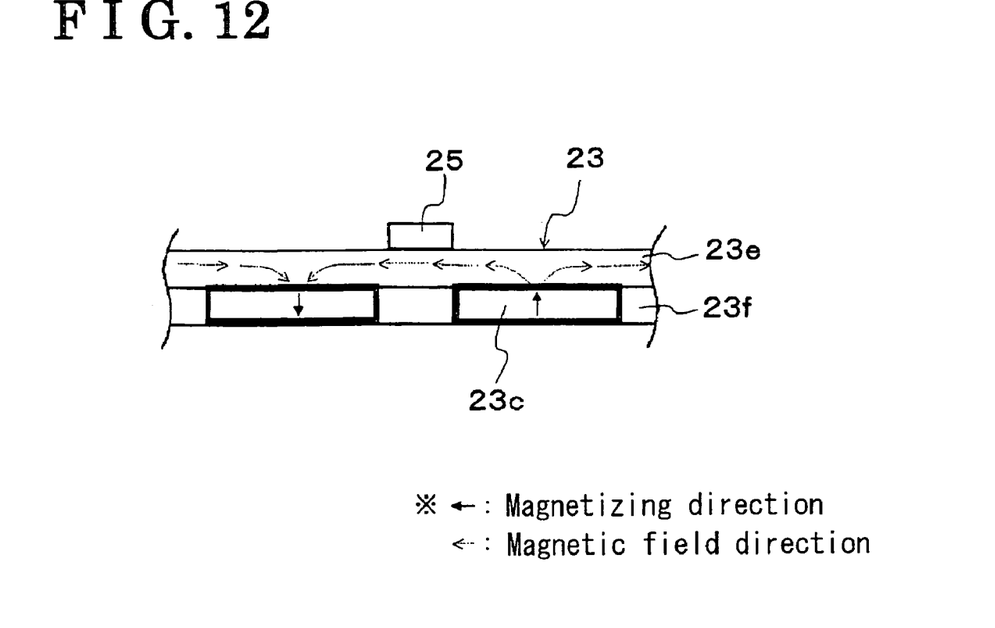
FIG. 12 is a plan view schematically illustrating, partially on a large scale, a structure of the end plate of the motor as seen from a b direction in FIG. 10.

Next, described below is a motor according to a second embodiment of the present invention with reference to FIG. 9. A structure of an end plate of a motor according to the second embodiment of the present invention is different from the aforementioned structure of the end plates 23 of the motor according to the first embodiment. An area of the end plates 23, the area which is not inserted with the magnets 23c, is made of two types of materials; one at the side of the rotor core 21 is a nonmagnetic material portion 23f, which is made of a nonmagnetic material, e.g. a stainless steel, an aluminum alloy, a copper alloy, and a ceramics, and the other one at an outer side (at a side that is axially opposite to the rotor side) is a soft magnetic material portion 23e, which is made of a soft magnetic material, e.g. an iron, as illustrated in FIG. 9. It is preferable that a thickness of the soft magnetic material portion 23e is designed at an extent at which DC magnetic saturation is not generated due to magnetic fluxes of the magnets 23c, as is illustrated in FIG. 12. That is, in the end plates 23 of the motor according to the second embodiment, the airgaps 23d of the end plates 23 of the motor according to the first embodiment are changed to the nonmagnetic material portions 23d, in order to prevent magnetic fluxes of the magnets 22 from leaking. The other structure of the motor according to the second embodiment, apart from the nonmagnetic material portion 23f, is the same as the one of the motor according to the first embodiment. Therefore, the same effect as the first embodiment can be generated.

Next, described below is a motor according to a third embodiment of the present invention. As a soft magnetic material portion (a portion which is not inserted with the magnets 23c out of the end plates 23 in FIG. 3), a powder core is adapted in the end plates 23 of the motor according to the second embodiment. Herein, this powder core is formed by compressing a magnetic powder applied with insulation. When a magnetic material is employed for the end plates 23, a magnetic flux density of the end plates 23 are enhanced, thereby increasing an iron loss at the end plates 23. Therefore, comparing with a normal iron, because a powder core is an insulated lamination, it is possible to restrain increase in an iron loss. Therefore, according to the third embodiment of the present invention, it is possible to restrain increase in an iron loss at the end plates 23.

Figure 13:
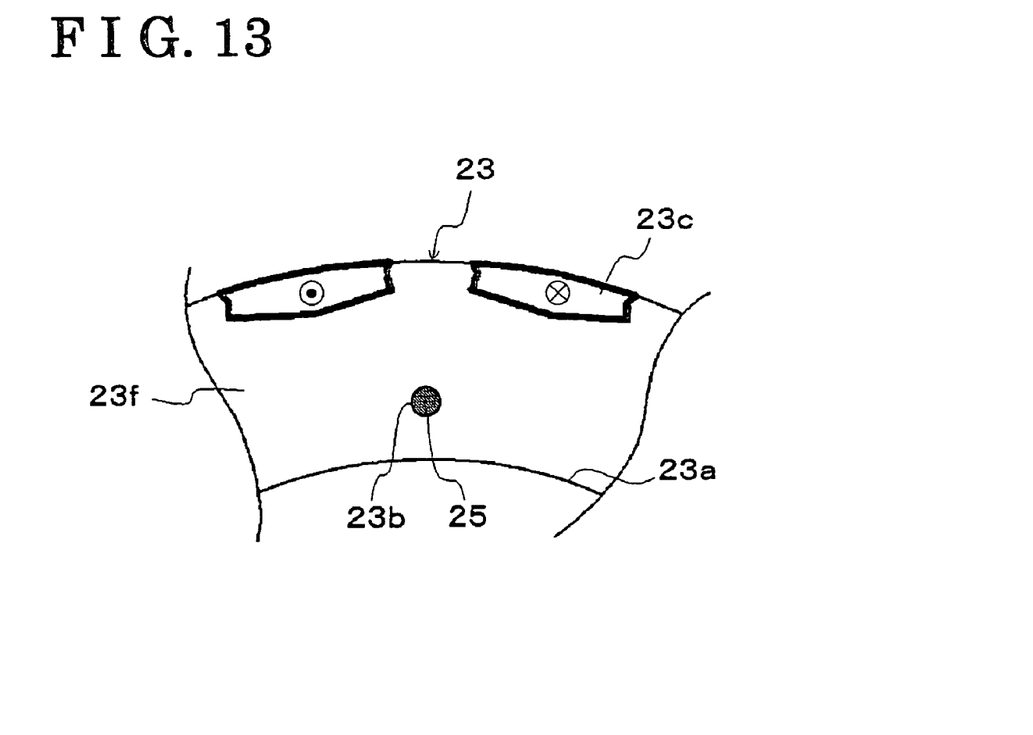
FIG. 13 is a plan view schematically illustrating, partially on a large scale, a structure of the end plate of the motor as seen from a d direction in FIG. 10.
Figure 14:
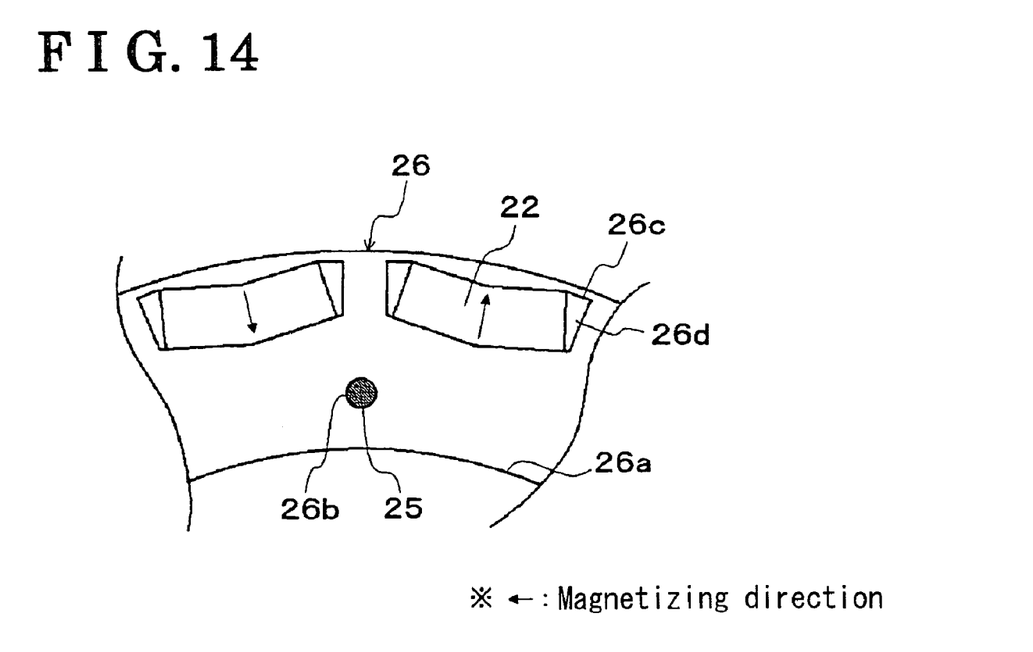
FIG. 14 is a plan view schematically illustrating, partially on a large scale, a structure of a core plate of the motor as seen from a d direction in FIG. 10.

Next, described below is a motor according to a fourth embodiment of the present invention. The permanent magnets (23c in FIG. 6 and 23c in FIG. 13) are formed to be of approximately wedge-shaped, and the end plates (23 in FIGS. 6 and 13) is provided with a housing portion of which shape corresponds to the wedge-shaped structure of each permanent magnet 23. Therefore, the permanent magnets 23c can be fitted into the end plates from an axial direction so as to be seated therein. Herein, when a contact area, between a portion of the rotor core 21, the portion which is at an outer peripheral side of the permanent magnets 22 embedded into the rotor core 21, and the permanent magnets 23c embedded into the end plates 23, is relatively great, it is possible to much increase an effect of torque-up without reducing a utilization ratio of the magnets, i.e., without reducing a degree of torque per unit volume of the magnet. This is because it is possible to extend the end plate magnets without increasing magnetic resistance of a magnetic circuit including the end plate magnets. Further, in light of assembly requirements, it is preferable that an outer diameter of each end plate is equal to or less than the outer diameter of the rotor core, thereby facilitating assembling of the rotor already being equipped with the end plates to the stator. According to the fourth embodiment of the present invention, a size-up preventing ring, which increases an outer diameter of the end plates, is not necessary, thereby enabling to extend a radial position of the permanent magnets 23 in a radially outward direction.

As described above, according to the first, second, third and fourth embodiments of the present invention, the pair of end plates 23 can contribute to torque generation. Further, it is possible to reduce a thickness of the rotor core 21 and hence to abbreviate an axial length of the motor.

The principles, the preferred embodiments and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A motor comprising:
   a rotor;
   a rotor core included in the rotor, the rotor core being configured to be built, thereinto, with at least one first magnet;

a pair of end plates, one of the pair of end plates being positioned at one axial end of the motor, the other one of the pair of end plates being positioned at the other axial end of the motor, and the pair of end plates holding the rotor core at axial ends of the rotor core; and at least one second magnet built into the pair of end plates and capable of producing magnetic fluxes in an axial direction of the motor;

wherein the at least one second magnet is positioned so as to be in contact with a portion of the rotor core which is positioned at a radially outer side of the at least one first magnet, a number of poles of the at least one second magnet at each of the pair of end plates is equal to a number of poles of the at least one first magnet, and a polarity of the at least one second magnet at a side of the rotor core is identical to a polarity at an outer peripheral side of the at least one first magnet.

2. A motor according to claim 1, wherein each of the pair of end plates is made, at a side axially opposite to the rotor relative to the at least one second magnet, of a soft magnetic material, and, at an area into which the at least one second magnet is inserted, possesses a nonmagnetic portion.

3. A motor according to claim 2, wherein the at least one second magnet is of approximately wedge-shaped, each of the pair of end plates possesses a housing corresponding to the wedge shaped structure of the at least one second magnet, and the at least one second magnet can be inserted into the pair of end plates from an axial direction.

4. A motor according to claim 1, wherein each of the pair of end plates, into which the at least one second magnet is not inserted, possesses, at a side axially opposite to the rotor, a soft magnetic material, and, at a side of the rotor core, possesses a nonmagnetic material portion that is made of a nonmagnetic material.

5. A motor according to claim 4, wherein the soft magnetic material is a powder core.

6. A motor according to claim 1, wherein the at least one second magnet is of approximately wedge-shaped, each of the pair of end plates possesses a housing corresponding to the wedge shaped structure of the at least one second magnet, and the at least one second magnet can be inserted into the pair of end plates from an axial direction.

7. A motor comprising:
a rotor;
a rotor core included in the rotor, the rotor core being configured to be built, thereinto, with at least one first magnet;
a pair of end plates, one of the pair of end plates being positioned at one axial end of the motor, the other one of the pair of end plates being positioned at the other axial end of the motor, and the pair of end plates holding the rotor core at axial ends of the rotor core; and
at least one second magnet built into the pair of end plates and capable of producing magnetic fluxes in an axial direction of the motor;
wherein the at least one second magnet is positioned so as to be in contact with the at least one first magnet.

8. A motor according to claim 7, wherein the at least one second magnet is positioned so as to be in contact with a portion of the rotor core which is positioned at a radially outer side of the at least one first magnet, a number of poles of the at least one second magnet at each of the pair of end plates is equal to a number of poles of the at least one first magnet, and a polarity of the at least one second magnet at a side of the rotor core is identical to a polarity at an outer peripheral side of the at least one first magnet.

9. A motor according to claim 7, wherein each of the pair of end plates is made, at a side axially opposite to the rotor relative to the at least one second magnet, of a soft magnetic material, and, at an area into which the at least one second magnet is inserted, possesses a nonmagnetic portion.

10. A motor according to claim 9, wherein the at least one second magnet is of approximately wedge-shaped, each of the pair of end plates possesses a housing corresponding to the wedge shaped structure of the at least one second magnet, and the at least one second magnet can be inserted into the pair of end plates from an axial direction.

11. A motor according to claim 7, wherein each of the pair of end plates, into which the at least one second magnet is not inserted, possesses, at a side axially opposite to the rotor, a soft magnetic material, and, at a side of the rotor core, possesses a nonmagnetic material portion that is made of a nonmagnetic material.

12. A motor according to claim 11, wherein the soft magnetic material is a powder core.

13. A motor according to claim 7, wherein the at least one second magnet is of approximately wedge-shaped, each of the pair of end plates possesses a housing corresponding to the wedge shaped structure of the at least one second magnet, and the at least one second magnet can be inserted into the pair of end plates from an axial direction.

14. A motor comprising:
a rotor;
a rotor core included in the rotor, the rotor core being configured to be built, thereinto, with at least one first magnet;
a pair of end plates, one of the pair of end plates being positioned at one axial end of the motor, the other one of the pair of end plates being positioned at the other axial end of the motor, and the pair of end plates holding the rotor core at axial ends of the rotor core; and
at least one second magnet built into the pair of end plates and capable of producing magnetic fluxes in an axial direction of the motor;
wherein each of the pair of end plates, into which the at least one second magnet is not inserted, possesses, at a side axially opposite to the rotor, a soft magnetic material, and, at a side of the rotor core, possesses a nonmagnetic material portion that is made of a nonmagnetic material.

15. A motor according to claim 14, wherein the soft magnetic material is a powder core.

16. A motor according to claim 15, wherein the at least one second magnet is of approximately wedge-shaped, each of the pair of end plates possesses a housing corresponding to the wedge shaped structure of the at least one second magnet, and the at least one second magnet can be inserted into the pair of end plates from an axial direction.

17. A motor according to claim 14, wherein the at least one second magnet is of approximately wedge-shaped, each of the pair of end plates possesses a housing corresponding to the wedge shaped structure of the at least one second magnet, and the at least one second magnet can be inserted into the pair of end plates from an axial direction.

18. A motor comprising:
a rotor;
a rotor core included in the rotor, the rotor core being configured to be built, thereinto, with at least one first magnet;

a pair of end plates, one of the pair of end plates being positioned at one axial end of the motor, the other one of the pair of end plates being positioned at the other axial end of the motor, and the pair of end plates holding the rotor core at axial ends of the rotor core; and at least one second magnet built into the pair of end plates and capable of producing magnetic fluxes in an axial direction of the motor;

wherein the at least one second magnet is of approximately wedge-shaped, each of the pair of end plates possesses a housing corresponding to the wedge shaped structure of the at least one second magnet, and the at least one second magnet can be inserted into the pair of end plates from an axial direction.

19. A motor comprising:

a rotor;

a rotor core included in the rotor, the rotor core being configured to be built, thereinto, with at least one first magnet;

a pair of end plates, one of the pair of end plates being positioned at one axial end of the motor, the other one of the pair of end plates being positioned at the other axial end of the motor, and the pair of end plates holding the rotor core at axial ends of the rotor core; and at least one second magnet built into the pair of end plates and capable of producing magnetic fluxes wherein a portion of the pair of end plates, which is axially opposite to a side of the rotor has a soft magnetic material, and at least a portion of the pair of end plates, which corresponds to the at least one first magnet, has a nonmagnetic portion.

* * * * *